(12) United States Patent
Vallee et al.

(10) Patent No.: US 12,038,528 B2
(45) Date of Patent: Jul. 16, 2024

(54) RADAR UNIT AND CORRESPONDING OPERATING METHOD

(71) Applicant: NXP USA, INC., Austin, TX (US)

(72) Inventors: Hugo Albert Vallee, Colomiers (FR); Cristian Pavao Moreira, Frouzins (FR)

(73) Assignee: NXP USA, Inc., Austin, TX (US)

( * ) Notice: Subject to any disclaimer, the term of this patent is extended or adjusted under 35 U.S.C. 154(b) by 403 days.

(21) Appl. No.: 17/459,007

(22) Filed: Aug. 27, 2021

(65) Prior Publication Data
US 2022/0107388 A1 Apr. 7, 2022

(30) Foreign Application Priority Data
Oct. 5, 2020 (EP) ..................................... 20306155

(51) Int. Cl.
*G01S 7/35* (2006.01)
*G01S 7/03* (2006.01)
*G01S 13/931* (2020.01)

(52) U.S. Cl.
CPC .............. *G01S 7/352* (2013.01); *G01S 7/032* (2013.01); *G01S 13/931* (2013.01)

(58) Field of Classification Search
None
See application file for complete search history.

(56) References Cited

U.S. PATENT DOCUMENTS

| | | | | |
|---|---|---|---|---|
| 6,055,556 A | * | 4/2000 | Barak | G06F 17/16 708/622 |
| 8,306,154 B2 | * | 11/2012 | Ruegamer | G01S 19/36 455/168.1 |
| 9,054,748 B2 | * | 6/2015 | Mo | H04B 1/0053 |
| 2006/0133551 A1 | * | 6/2006 | Davidoff | H04B 1/001 375/350 |
| 2008/0287085 A1 | * | 11/2008 | Forstner | G01S 7/032 455/293 |
| 2018/0267144 A1 | * | 9/2018 | Lin | G01S 7/4021 |
| 2019/0086517 A1 | * | 3/2019 | Puglia | G01S 7/4814 |

OTHER PUBLICATIONS

Wu, B., "A High-linearity CMOS Analog Baseband Circuit with Reconfigurable Gain and Bandwidth for 76 81GHz Automotive Radar", 14th IEEE International Conference on Solid-State and Integrated Circuit Technology, Oct. 31, 2018.

* cited by examiner

*Primary Examiner* — James R Hulka
*Assistant Examiner* — Brandon James Henson

(57) ABSTRACT

In accordance with a first aspect of the present disclosure, a radar unit is provided, comprising: a receiver circuit configured to receive a radar signal; a controller configured to control said receiver circuit, wherein said controller is configured to cause said receiver circuit to operate either in a complex receiver mode or in a real receiver mode. In accordance with a second aspect of the present disclosure, a method of operating a radar unit is conceived, comprising: receiving, by a receiver circuit comprised in the radar unit, a radar signal; controlling, by a controller comprised in said radar unit, said receiver circuit, wherein said controller causes said receiver circuit to operate either in a complex receiver mode or in a real receiver mode.

20 Claims, 8 Drawing Sheets

RADAR UNIT AND CORRESPONDING OPERATING METHOD

TECHNICAL FIELD

The present disclosure relates to a radar unit. Furthermore, the present disclosure relates to a corresponding method of operating a radar unit.

BACKGROUND

Automotive radar solutions for advanced driver assistance systems (ADAS) are currently being deployed on a large scale. These solutions can typically be grouped into long-range radar applications (LRR) and short-range radar (SRR) applications. Both of these applications typically use frequency modulated continuous wave (FMCW) modulation techniques in order to be able to identify a radar target, such as a car or a pedestrian. These radar systems typically utilize millimeter wave (mmW) frequencies for transmission and reception.

SUMMARY

In accordance with a first aspect of the present disclosure, a radar unit is provided, comprising: a receiver circuit configured to receive a radar signal, a controller configured to control said receiver circuit, wherein said controller is configured to cause said receiver circuit to operate either in a complex receiver mode or in a real receiver mode.

In one or more embodiments, the complex receiver mode corresponds to a long-range radar (LRR) mode of the radar unit and the real receiver mode corresponds to a short-range radar (SRR) mode of the radar unit.

In one or more embodiments, the controller is further configured to cause the receiver circuit to use, in the complex receiver mode, an I-channel and a Q-channel of the received radar signal.

In one or more embodiments, the controller is further configured to cause the receiver circuit to use, in the real receiver mode, only said I-channel of the received radar signal.

In one or more embodiments, the controller is configured to cause said receiver circuit to use only said I-channel by shorting the Q-channel to ground.

In one or more embodiments, the controller is further configured to increase a high-pass filter capacitance of the I-channel and to decrease a high-pass filter resistance of the I-channel when the receiver circuit operates in the real receiver mode.

In one or more embodiments, the controller is configured to double the high-pass filter capacitance and to divide the high-pass filter resistance by two.

In one or more embodiments, the controller is configured to increase said high-pass filter capacitance of the I-channel by connecting a high-pass filter capacitance of the Q-channel to said I-channel.

In one or more embodiments, the controller is configured to decrease the high-pass filter resistance of the I-channel by controlling a variable resistor.

In one or more embodiments, the controller is configured to cause the receiver unit to alternate between operating in the complex receiver mode and operating in the real receiver mode.

In one or more embodiments, said alternating comprises switching from the complex receiver mode to the real receiver mode or from the real receiver mode to the complex receiver mode after one or more frames of the received radar signal.

In one or more embodiments, the receiver circuit includes a millimeter wave (mmW) unit and a baseband unit and said radar signal is an echo signal of a radar signal previously transmitted by the radar unit.

In one or more embodiments, a vehicle comprises a radar unit of the kind set forth.

In accordance with a second aspect of the present disclosure, a method of operating a radar unit is conceived, comprising: receiving, by a receiver circuit comprised in the radar unit, a radar signal; controlling, by a controller comprised in said radar unit, said receiver circuit, wherein said controller causes said receiver circuit to operate either in a complex receiver mode or in a real receiver mode.

In one or more embodiments, the complex receiver mode corresponds to a long-range communication mode of the radar unit and the real receiver mode corresponds to a short-range communication mode of the radar unit.

DESCRIPTION OF DRAWINGS

Embodiments will be described in more detail with reference to the appended drawings, in which.

DESCRIPTION OF EMBODIMENTS

Figure 1:
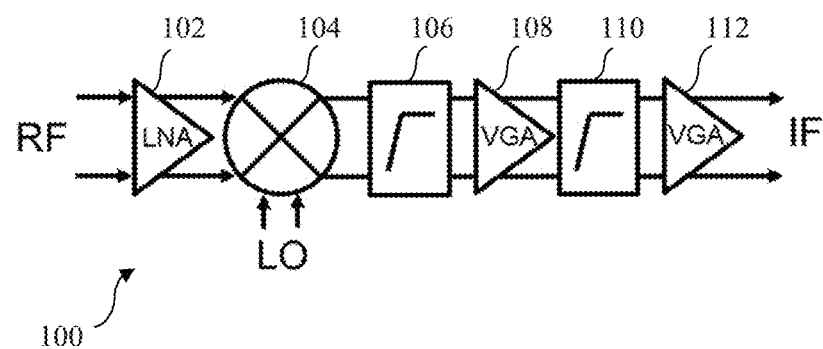
FIG. 1 shows an example of a radar receiver line-up.

As mentioned above, automotive radar solutions for advanced driver assistance systems (ADAS) are currently being deployed on a large scale. These solutions can typically be grouped into long-range radar applications (LRR) and short-range radar (SRR) applications. Both of these applications typically use frequency modulated continuous wave (FMCW) modulation techniques in order to be able to identify a radar target, such as a car or a pedestrian. These radar systems typically utilize millimeter wave (mmW) frequencies for transmission and reception.

Two important trends can be distinguished in the automotive radar market: an increase of the transceiver performance and an increase of the level of integration of components towards a single chip—a so-called System on Chip (SoC)—wherein specifically the transceiver is combined with a microcontroller unit (MCU). Both trends stimulate the use of deep complementary metal-oxide-semiconductor (CMOS) technologies, which may provide a radio frequency (RF) performance equivalent to bipolar plus CMOS (BiC-MOS) silicon-germanium (SiGe) technologies, while enabling the integration of digital functions as performed by the MCU. Both the increased transceiver performance and the increased level of integration facilitate the implementation of different applications, ranging from long-range applications (300 meters or more) to very short-range applications (30 meters or less). It is noted that the same transceiver circuit may be used to support these different applications.

A transceiver typically contains a signal transmission function or signal transmission unit (i.e., a transmitter) and a signal receiving function or signal receiving unit (i.e., a receiver). The noise figure (NF) of the receiver is an important measure of the performance of a radar unit, in the sense that it influences the detection range of the receiver and thus of the radar unit as a whole. While advanced CMOS allows increasing a receiver's bandwidth or intermediate frequency (IF), which in turn allows increasing the maximum detection range, it is well known that CMOS receivers suffer from a high flicker noise (i.e., a low frequency noise) that can be dominant at medium frequencies (up to 2 MHz). As a consequence, the detection capability at short distances may be negatively affected.

Advanced radar CMOS receivers are often based on an IQ topology, which facilitates reducing the overall receiver NF by 3 dB, mainly at a high intermediate frequency (2 MHz or higher), but at the cost of additional area because baseband (BB) filters and BB variable gain amplifiers (VGAs) have to be implemented as well. It is noted that, according to the IQ topology, a received signal is divided into an I-component or I-channel and a Q-component or Q-channel. The I-channel is the received signal without a phase shift (i.e., the "in-phase" or reference signal), while the Q-channel is the received signal shifted by 90 degrees (i.e., the received signal in quadrature). In spite of the IQ topology, the flicker noise may remain high, which is mainly caused by the use of the active stages of the baseband unit (i.e., the VGAs). In order to improve flicker noise and reduce the corner frequency, a relatively simple solution is to increase the capacitance and to reduce the resistance of the filter components. However, the area can only be increased to a certain extent, and it remains difficult to achieve the required performance in terms of an acceptable noise figure at low frequencies.

Accordingly, although deep CMOS technology allows increasing the receiver bandwidth and increasing the target detection range, it may result in a higher noise figure at low frequencies, which is mainly due to flicker noise generated by the baseband stages (high-pass filter and variable gain amplifiers). To remedy this, complex receivers are commonly used. Complex receivers improve, at least theoretically, the receiver's noise figure by around 3 dB, but at the cost of a large area, which is mainly attributable the baseband high-pass filter, because the baseband component is duplicated.

FIG. 1 shows an example of a radar receiver line-up 100. In particular, the receiver includes a low noise amplifier 102, a mixer 104, a high-pass filter 106, a variable gain amplifier 108, another high-pass filter 110 and another variable gain amplifier 112. In this typical receiver line-up, the mixer 104 is controlled by a local oscillator (LO).

Figure 2:
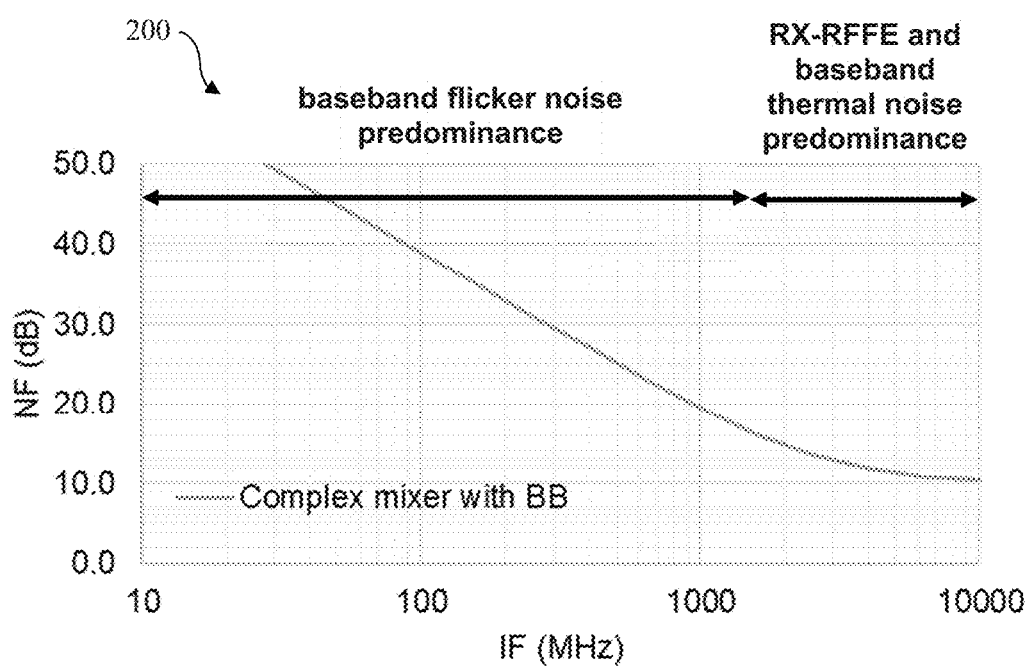
FIG. 2 shows an example of a receiver circuit performance.

FIG. 2 shows an example of a receiver circuit performance 200. In CMOS technologies, the flicker noise is an important factor, which determines the noise performance of the baseband analog components. Since the radio frequency front end of a receiver circuit (RX-RFFE) cannot have a high gain (i.e., a gain higher than 18 dB) given the linearity specification, the baseband noise has a significant impact on the radar performance, as shown in FIG. 2. In particular, it shows an RX-RFFE performance with a gain of 10 dB. In this example, the baseband components include a filter and a variable gain amplifier. Considering the intermediate frequency (IF), two regions may be defined: for an IF above 2 MHz, the RX-RFFE and baseband thermal noise are predominant, w % bile for an IF below 2 MHz, the baseband flicker noise becomes more predominant.

Figure 3:
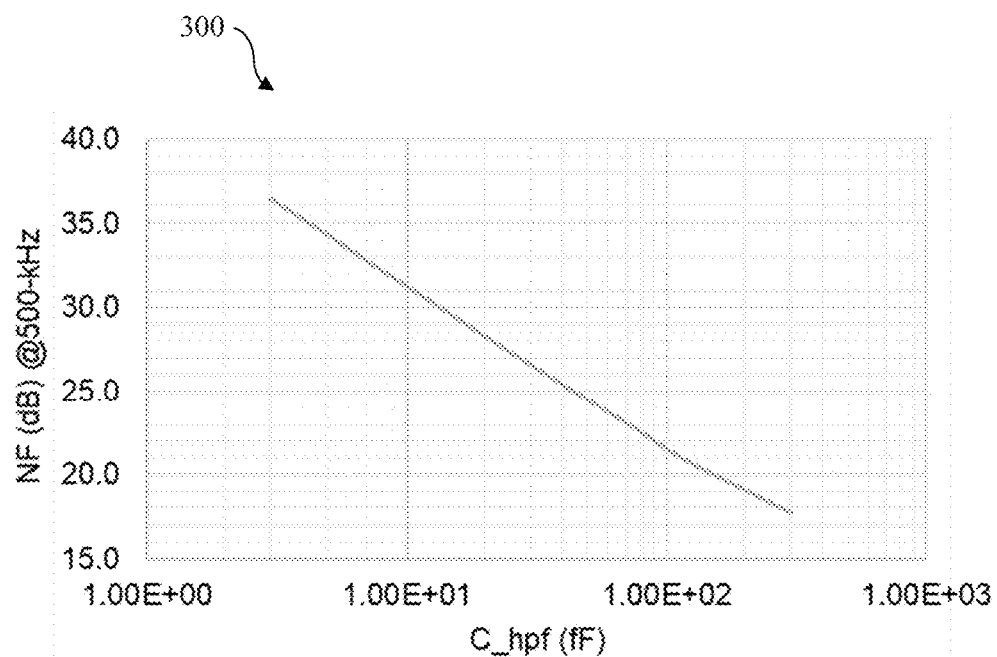
FIG. 3 shows an example of a noise performance regarding the RC sizing of a high-pass filter.

FIG. 3 shows an example of a noise performance 300 regarding the RC sizing of a high-pass filter. For a radar receiver line-up 100 as shown for example in FIG. 1, the baseband noise management is mainly based on controlling the capacitance of the high-pass filter, as illustrated in FIG. 3. In particular, a trade-off should be achieved, because in order to reduce the baseband noise, the capacitance of the high-pass filter ($C_{HPF}$) should be increased, but in order to reduce the area (i.e., the silicon footprint), the capacitance of the high-pass filter should be decreased. More specifically, FIG. 3 shows the noise performance at an intermediate frequency of 500 kHz, for a 8 dB downconverter with a first-order high-pass filter having a variable capacitance.

Now discussed are a radar unit and a corresponding method of operating a radar unit, which facilitate reducing the noise figure at lower frequencies—thus reducing the flicker noise—with minimal or no impact on the area, while increasing the noise figure at higher frequencies. This, in turn, will facilitate increasing the overall performance of the radar unit and it will facilitate properly supporting both long-range radar applications and short-range radar applications.

Figure 4:
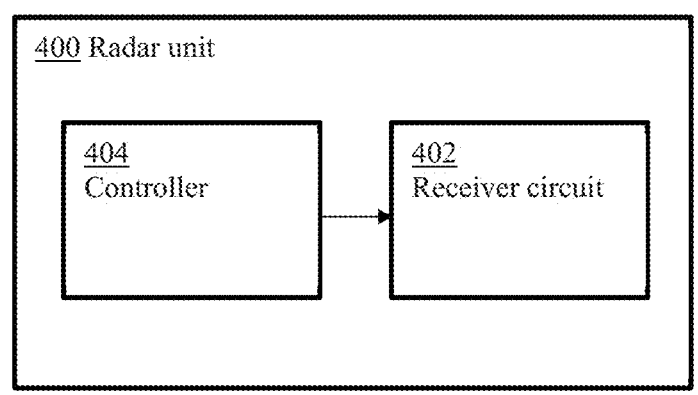
FIG. 4 shows an illustrative embodiment of a radar unit.

FIG. 4 shows an illustrative embodiment of a radar unit 400. The radar unit 400 comprises a receiver circuit 402 and a controller 404. The receiver circuit 402 is configured to receive a radar signal. For instance, the receiver circuit 402 may include a millimeter wave (mmW) unit and a baseband unit, and the radar signal may be an echo signal of a radar signal previously transmitted by the radar unit. In particular, the baseband unit may be used for the demodulation of the radar signal. Furthermore, the controller 404 is configured to control the receiver circuit 402. More specifically, the controller 404 is configured to cause the receiver circuit 402 to operate either in a complex receiver mode or in a real receiver mode. In this way, the performance of the radar unit 400 may be increased. Furthermore, in this way, the radar unit 404 may properly support both long-range radar applications and short-range radar applications. In particular, the receiver 402, which may be based on an IQ topology, may be programmed or configured to operate as a real receiver temporarily. This may facilitate reducing the noise figure at lower frequencies, thus decreasing the flicker noise, while increasing said noise figure at higher frequencies.

In one or more embodiments, the complex receiver mode corresponds to a long-range radar (LRR) mode of the radar unit and the real receiver mode corresponds to a short-range radar (SRR) mode of the radar unit. By operating the receiver circuit in the real receiver mode in SRR applications, i.e. at short distances, the detection capability at these short distances may be improved. Furthermore, in one or more embodiments, the controller is further configured to cause the receiver circuit to use, in the complex receiver mode, an I-channel and a Q-channel of the received radar signal. In this way, the receiver circuit may easily be configured or programmed to work in the complex receiver mode. In one or more embodiments, the controller is further configured to cause the receiver circuit to use, in the real receiver mode, only said I-channel of the received radar signal. In this way, the receiver circuit may easily be configured or programmed to work in the real receiver mode. Furthermore, in one or more embodiments, the controller is configured to cause said receiver circuit to use only said I-channel by shorting the Q-channel to ground. This further facilitates operating the receiver circuit in the real receiver mode.

Furthermore, in one or more embodiments, the controller is further configured to increase a high-pass filter capacitance of the I-channel and to decrease a high-pass filter resistance of the I-channel when the receiver circuit operates in the real receiver mode. For instance, the controller may be configured to double the high-pass filter capacitance and to divide the high-pass filter resistance by two. In a practical implementation, the controller is configured to increase said high-pass filter capacitance of the I-channel by connecting a high-pass filter capacitance of the Q-channel to said I-channel. Thus, to reduce the silicon area, some capacitances of the Q-channel may be reused to change the RC filter of the I-channel when the receiver circuit operates in the real receiver mode, because the Q-channel is no longer used. More specifically, the capacitance $C_{HPF}$ of the Q-channel may be reused in the I-channel, such that the total capacitance of the I-channel becomes $2 \cdot C_{HPF}$. Furthermore, in a practical implementation, the controller is configured to decrease the high-pass filter resistance of the I-channel by controlling a variable resistor. More specifically, as mentioned above, the resistance may be divided by two ($R_{HPF}/2$), such that the filter cut-off frequency remains the same. This may facilitate decreasing the noise figure at lower frequencies (thus decreasing flicker noise) while increasing it at higher frequencies, with minimal or no impact on the area.

In one or more embodiments, the controller is configured to cause the receiver unit to alternate between operating in the complex receiver mode and operating in the real receiver mode. In a practical implementation, said alternating comprises switching from the complex receiver mode to the real receiver mode or from the real receiver mode to the complex receiver mode after one or more frames of the received radar signal. In this way, depending on the radar scene and use case, the radar unit can be configured and reconfigured in a flexible manner, in order to support both long-range detection and short-range detection, without a significant impact on the silicon footprint.

Figure 5:
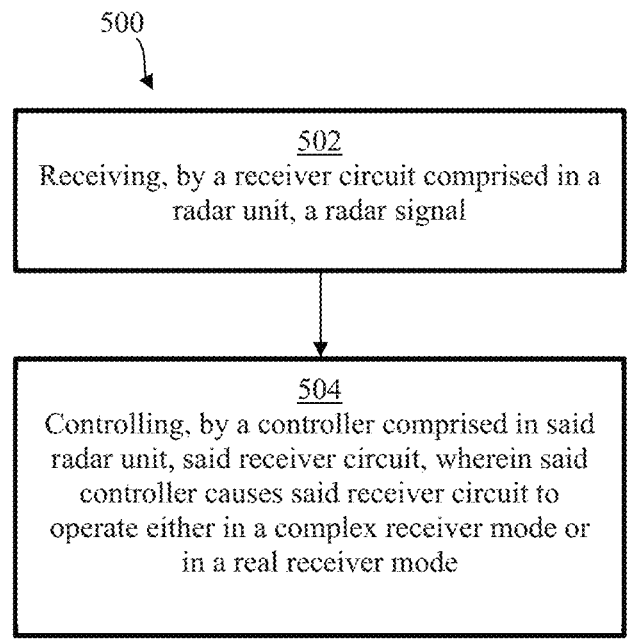
FIG. 5 shows an illustrative embodiment of a method of operating a radar unit.

FIG. 5 shows an illustrative embodiment of a method 500 of operating a radar unit of the kind set forth. The method 500 comprises the following steps. At 502, a receiver circuit comprised in a radar unit receives a radar signal. Furthermore, at 504, a controller comprised in said radar unit controls said receiver circuit, in particular by causing said receiver circuit to operate either in a complex receiver mode or in a real receiver mode. The method 500 facilitates increasing the performance of a radar unit of the kind set forth.

The presently disclosed radar unit and operating method facilitate trading off a high-frequency noise figure and a low-frequency noise figure by programming the receiver circuit to operate either in the complex receiver mode or in the real receiver mode, depending the radar system requirements. In addition, when programmed as a real receiver, the high-pass filter may use the full complex receiver filter capacitance (2C), and half of the resistance (R/2), which facilitates reducing the baseband flicker noise, and consequently the noise figure at low frequencies. In other words, in accordance with the present disclosure, a programmable complex receiver may be configured to operate as a real receiver, with different resistances and capacitances coupled in the baseband filters, but with the same final cut-off frequency. In particular, two complex receiver baseband filters may combine, when programmed to operate as a unique real receiver, their high-pass filter capacitors (C+C) to form a single capacitor (2C), which may be active in the I-channel, and half of the resistor (R/2) in order to keep the same filter cut-off frequency $Fc=1/(2\pi*RC)$.

Furthermore, the presently disclosed method of operating a radar unit may be implemented in such a way a sequence of received frames is processed in an interleaved manner. That is to say, one or more frames may be processed by the receiver circuit operating in the complex receiver mode, one or more subsequent frames may be processed by the receiver circuit operating the real receiver mode, one or more further subsequent frames may again be processed by the receiver circuit operating in the complex receiver mode, etc. The number of frames after which a switch to the other mode occurs may also be programmable or configurable and depend on the radar system characteristics.

Figure 6:
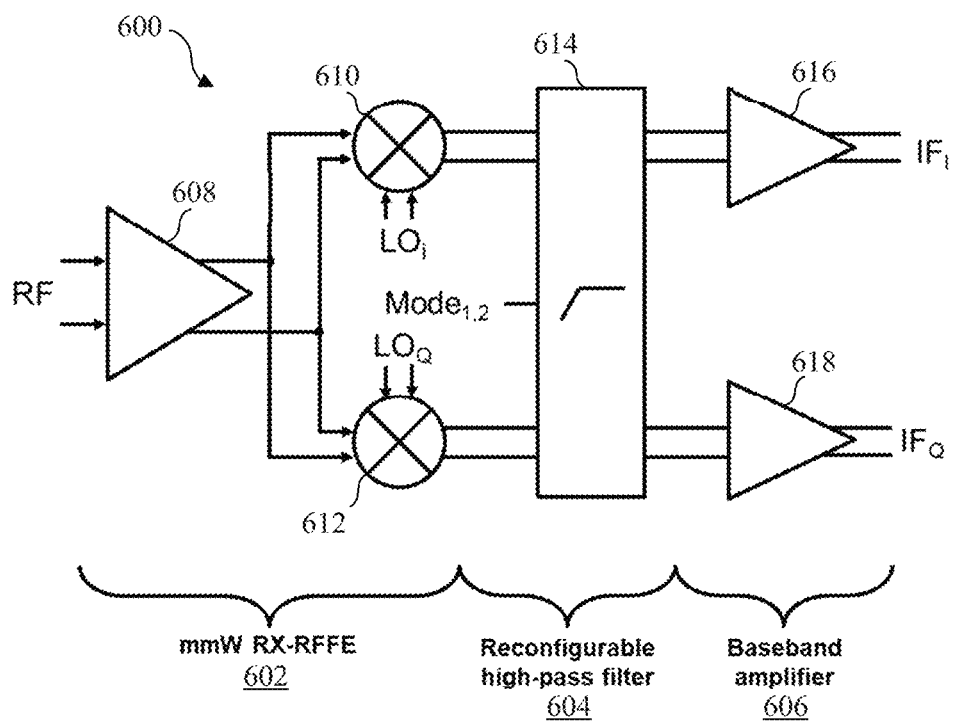
FIG. 6 shows an illustrative embodiment of a configurable receiver circuit.

FIG. 6 shows an illustrative embodiment of a configurable receiver circuit 600. The configurable receiver circuit 600 is based on an IQ topology, and comprises a millimeter wave radio frequency front end 602, a reconfigurable high-pass filter 604, a baseband amplifier 606 which includes an amplifier 616 of the I-channel and an amplifier 618 of the Q-channel, an amplifier 608 of the front end, a mixer 610 of the I-channel controlled by a local oscillator, a mixer 612 of the Q-channel controlled by another local oscillator, and a high-pass filter 614. In operation, a controller (not shown) of the radar unit controls the receiver circuit 600, in particular the high-pass filter 614, in such a way that the circuit either operates in a complex mode (in which both the I-channel and the Q-channel are used) or in a real mode (in which only the I-channel is used).

More specifically, a reconfigurable receiver circuit 600 is shown, which is able to switch between two modes of operation. The first mode a complex receiver mode, which may correspond to a long-range radar mode. In this mode, a high intermediate frequency (IF) is targeted and a regular baseband filter may be applied. Furthermore, complex mixing is applied in order to reduce the noise figure of the mmW front end. The second mode is a real receiver mode, which may correspond to a short-range radar mode. In this mode, a lower noise figure is not needed, because the baseband noise is predominant. Thus, in this mode, real mixing is applied, and the baseband filter is reconfigured in order to re-use the capacitance of the Q-channel. In this way, a baseband noise reduction may be achieved, while the silicon footprint and the cut-off frequency may be kept substantially unchanged.

Figure 7:
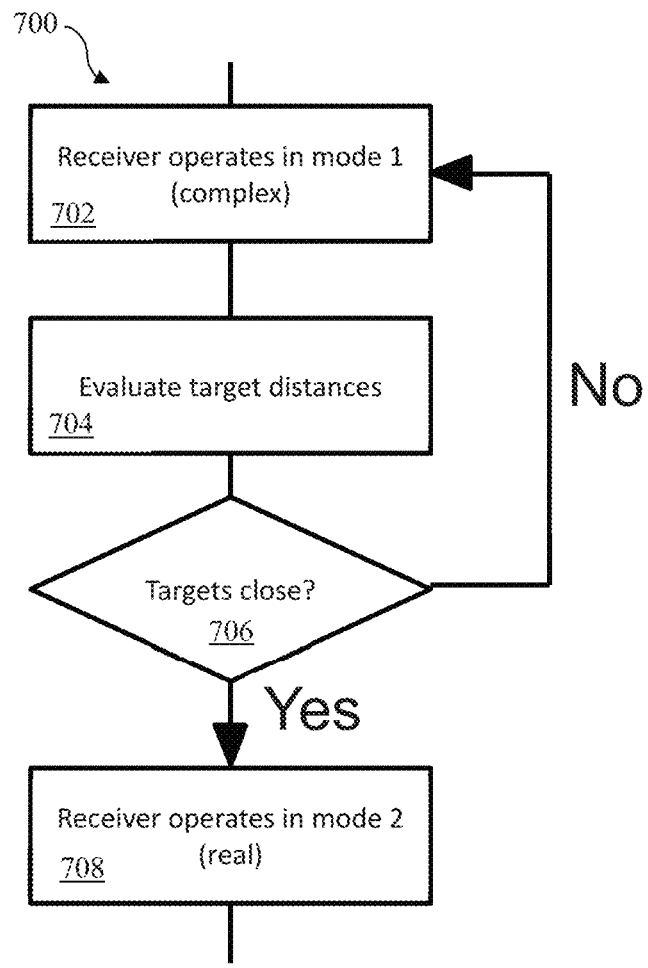
FIG. 7 shows an illustrative embodiment of a receiver mode selection process.

FIG. 7 shows an illustrative embodiment of a receiver mode selection process 700. The process 700 comprises the following steps. At 702, the receiver operates in a first mode, i.e. a complex receiver mode, which may also be referred to as a quadrature mode. At 704, the distance to at least one communication target is evaluated. Then, at 706, a decision is taken. If said target is relatively close to the radar unit, then the receiver may switch to a second mode of operation, i.e. a real receiver mode. Otherwise, the receiver may remain operating in the first mode. The evaluation of the distance and switching to the second mode, if applicable, may be performed after each frame of the received radar signal. Accordingly, after a frame received while the receiver operated in the first mode, the target distance may be evaluated. If one or more close targets are present and a more accurate measurement is needed, then the receiver switches to the second mode of operation. It is noted that the accuracy of range and velocity measurements typically depends on the signal-to-noise ratio.

Figure 8A:
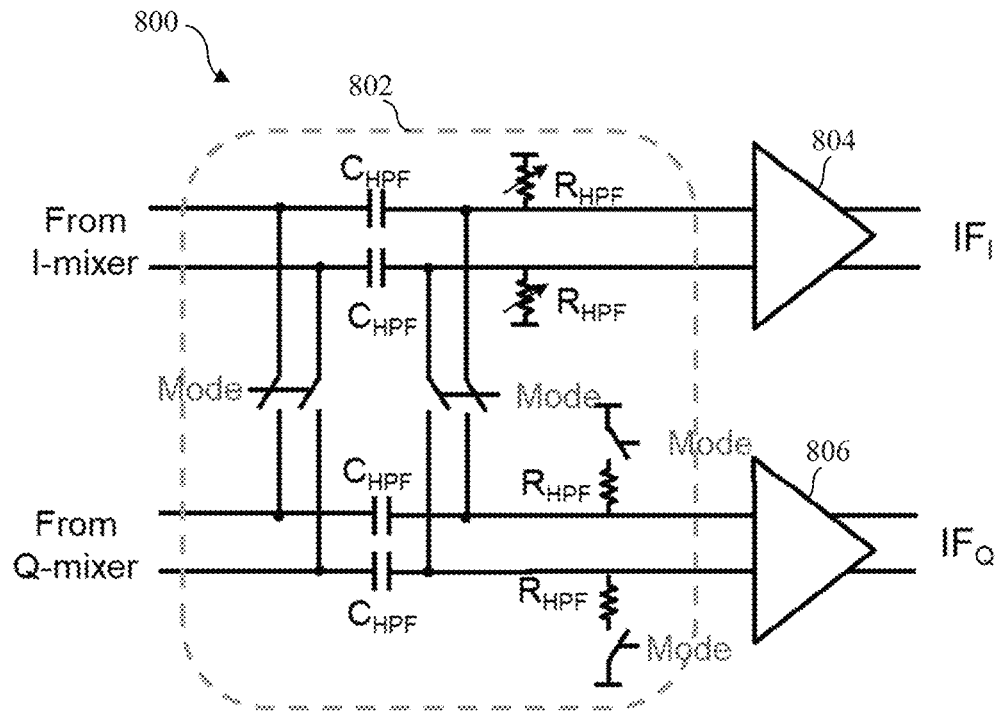
FIG. 8A shows an illustrative embodiment of a reconfigurable high-pass filter.
Figure 8B:
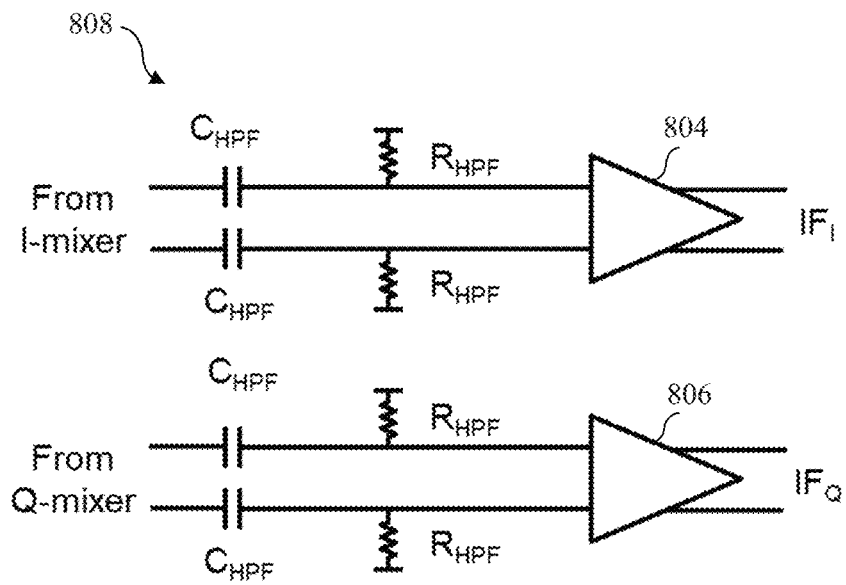
FIG. 8B shows an illustrative embodiment of an operation in the complex receiver mode.
Figure 8C:
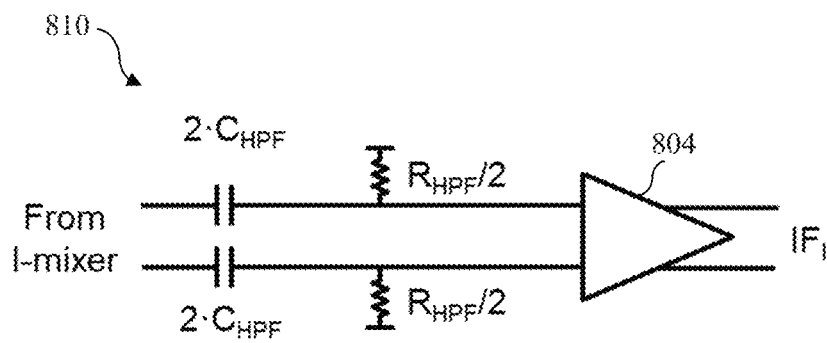
FIG. 8C shows an illustrative embodiment of an operation in the real receiver mode.

FIGS. 8A, 8B and 8C show an illustrative embodiment of a reconfigurable high-pass filter 800, an illustrative embodiment of an operation in the complex receiver mode 808, and an illustrative embodiment of an operation in the real receiver mode 810, respectively. The reconfigurable high-pass filter 800 comprises a receiver mode switching block 802, by means of which the mode of operation of the receiver can be changed from the complex receiver mode to the real receiver mode, or from the real receiver mode to the complex receiver mode. In the complex receiver mode 808, both the I-channel and the Q-channel of the received radar signal are used. In the real receiver mode 810, only the I-channel of the received radar signal is used. More specifically, in the complex receiver mode, complex mixing is applied to minimize the noise contribution of the radio frequency front end. This is useful when the intermediate frequency is high, and no flicker noise is present. In the real receiver mode 810, the receiver is operated as a real receiver. Therefore, the mixer of the Q-channel is not used, and a combination of the quadrature high-pass filter capacitors with the in-phase high-pass filter capacitors is possible. By forming a single capacitor ($2 \cdot C_{HPF}$) and dividing the high-pass filter resistor by two, it is possible to minimize the noise contribution of the baseband unit. This is useful when the intermediate frequency is low and flicker noise is present.

Figure 9A:
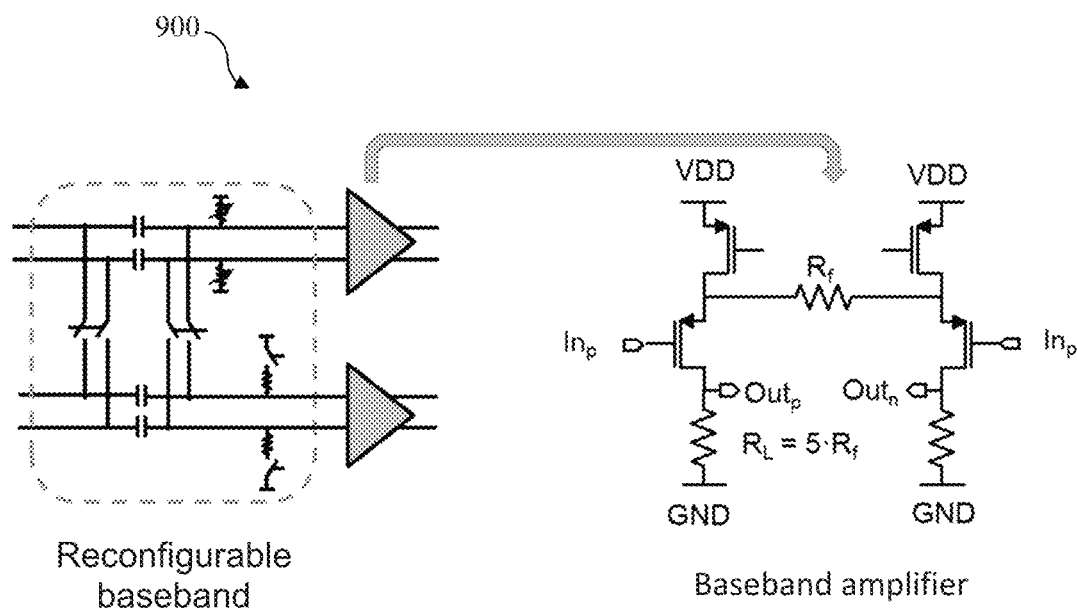
FIG. 9A shows an illustrative embodiment of a reconfigurable baseband unit including an amplifier implementation.
Figure 9B:
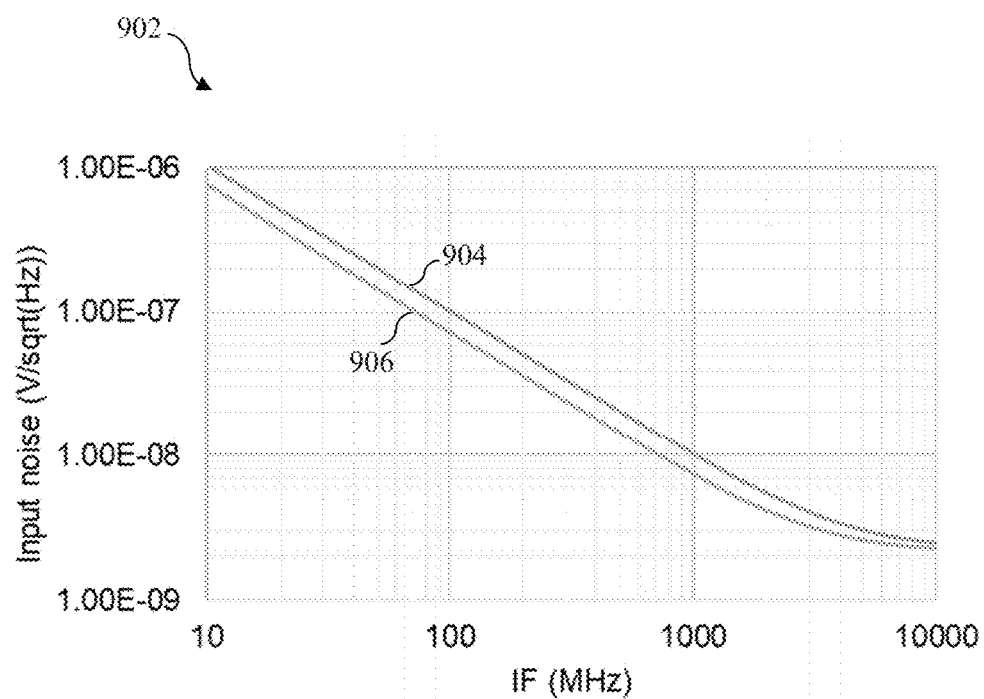
FIG. 9B shows an illustrative embodiment of the input noise of the reconfigurable baseband unit, which includes a filter and an amplifier.
Figure 9C:
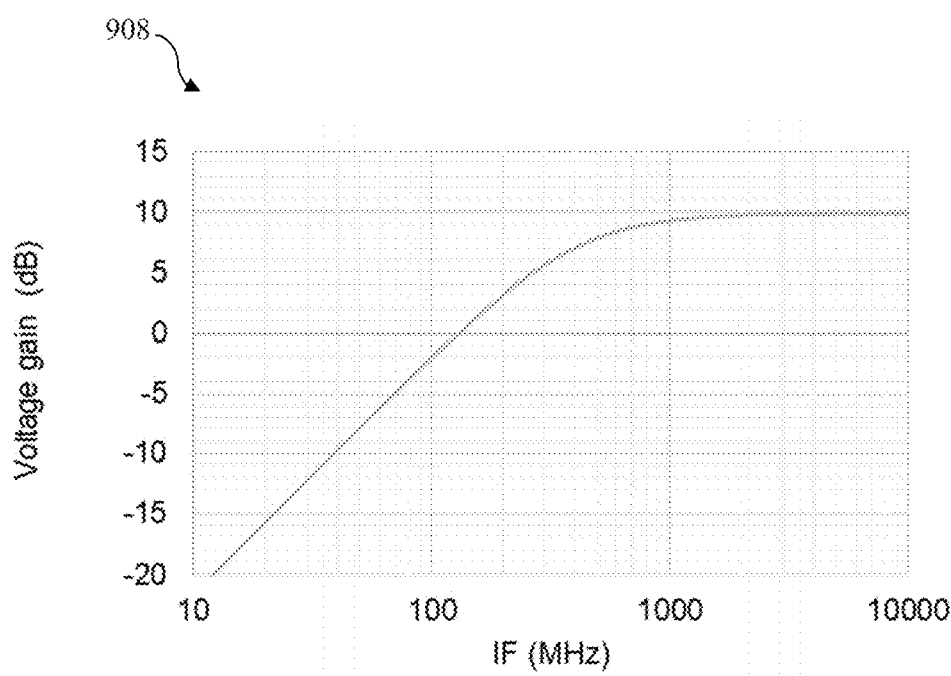
FIG. 9C shows an illustrative embodiment of the voltage gain of the reconfigurable baseband unit.

FIGS. 9A, 9B and 9C show an illustrative embodiment of a reconfigurable baseband unit including an amplifier implementation 900, an illustrative embodiment of the input noise 902 of the reconfigurable baseband unit, which includes a filter and an amplifier, and an illustrative embodiment of the voltage gain 908 of the reconfigurable baseband unit, respectively. In FIG. 9B, line 904 represents the input noise in the complex receiver mode (LRR), and line 906 represents the input noise in the real receiver mode (SRR). In particular, it is shown that the presently disclosed radar unit and corresponding operating method may achieve the desired effect. At lower intermediate frequencies, the input noise 902 of the reconfigurable baseband unit is reduced by operating the receiver in the real receiver mode. In this mode of operation, the re-use of the high-pass filter capacitance of the Q-channel may result in a noise reduction of approximately 30 percent, while the voltage gain 908 and linearity are maintained. Furthermore, the skilled person will appreciate that the switches may be designed in such a way that the isolation of the channels is not degraded.

Figure 10:
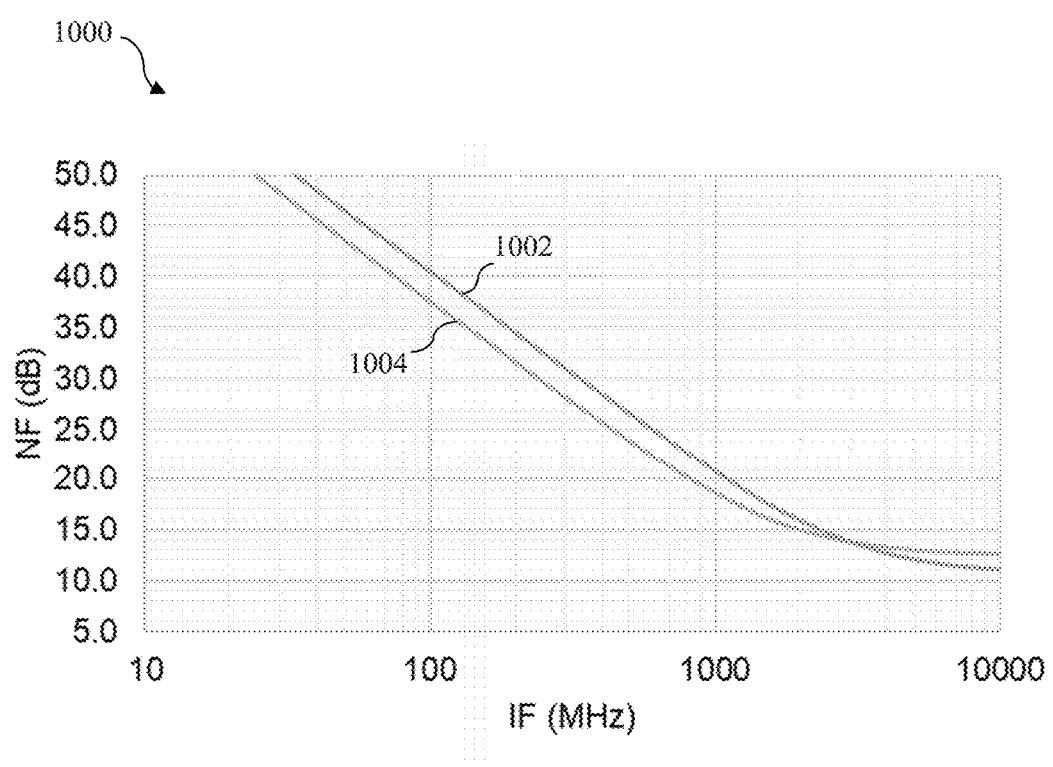
FIG. 10 shows an illustrative embodiment of a noise figure of the receiver circuit.

FIG. 10 shows an illustrative embodiment of a noise figure 1000 of a receiver circuit of the kind set forth. In particular, line 1002 represents the noise figure in the complex receiver mode (LRR), and line 1004 represents the noise figure in real receiver mode (SRR). In this example, the application of the real receiver mode at lower frequencies results in a noise figure increase decrease of approximately 3 dB compared to a scenario in which the receiver would keep operating in the complex receiver mode. At higher frequencies, the application of the complex receiver mode results in a better noise performance.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 radar receiver line-up
102 low noise amplifier
104 mixer
106 high-pass filter
108 variable gain amplifier
110 high-pass filter
112 variable gain amplifier
200 example of a receiver circuit performance
300 example of a noise performance regarding the RC sizing of a high-pass filter
400 radar unit
402 receiver circuit
404 controller
500 method of operating a radar unit
502 receiving, by a receiver circuit comprised in a radar unit, a radar signal
504 controlling, by a controller comprised in said radar unit, said receiver circuit, wherein said controller causes said receiver circuit to operate either in a complex receiver mode or in a real receiver mode
600 configurable receiver circuit
602 millimeter wave radio frequency front end of the receiver circuit
604 reconfigurable high-pass filter
606 baseband amplifier
608 amplifier
610 mixer
612 mixer
614 high-pass filter
616 mixer
618 mixer
700 receiver mode selection process
702 receiver operates in mode 1 (complex)
704 evaluate target distances
706 targets close?
708 receiver operates in mode 2 (real)
800 reconfigurable high-pass filter
802 receiver mode switching block
804 amplifier
806 amplifier
808 operation in the complex receiver mode
810 operation in the real receiver mode
900 reconfigurable baseband unit including amplifier implementation
902 input noise
904 input noise in complex receiver mode (LRR)
906 input noise in real receiver mode (SRR)
908 voltage gain
1000 noise figure
1002 noise figure in complex receiver mode (LRR)
1004 noise figure in real receiver mode (SRR)

The invention claimed is:

1. A radar unit comprising:
a receiver circuit configured to receive a radar signal;
a controller configured to control said receiver circuit, wherein said controller is configured to cause said receiver circuit to operate either in a complex receiver mode or in a real receiver mode, wherein said controller is configured to increase a capacitance of a filter and reduce a resistance of the filter.

2. The radar unit of claim 1, wherein the complex receiver mode corresponds to a long-range radar, LRR, mode of the radar unit and wherein the real receiver mode corresponds to a short-range radar, SRR, mode of the radar unit.

3. The radar unit of claim 1, wherein the controller is further configured to cause the receiver circuit to use, in the complex receiver mode, an I-channel and a Q-channel of the received radar signal.

4. The radar unit of claim 3, wherein the controller is further configured to cause the receiver circuit to use, in the real receiver mode, only said I-channel of the received radar signal.

5. The radar unit of claim 4, wherein the controller is configured to cause said receiver circuit to use only said I-channel by shorting the Q-channel to ground.

6. The radar unit of claim 4, wherein the controller is further configured to increase a high-pass filter capacitance of the I-channel and to decrease a high-pass filter resistance of the I-channel when the receiver circuit operates in the real receiver mode.

7. The radar unit of claim 6, wherein the controller is configured to double the high-pass filter capacitance and to divide the high-pass filter resistance by two.

8. The radar unit of claim 6, wherein the controller is configured to increase said high-pass filter capacitance of the I-channel by connecting a high-pass filter capacitance of the Q-channel to said I-channel.

9. The radar unit of claim 6, wherein the controller is configured to decrease the high-pass filter resistance of the I-channel by controlling a variable resistor.

10. The radar unit of claim 1, wherein the controller is configured to cause the receiver unit to alternate between operating in the complex receiver mode and operating in the real receiver mode.

11. The radar unit of claim 10, wherein said alternating comprises switching from the complex receiver mode to the real receiver mode or from the real receiver mode to the complex receiver mode after one or more frames of the received radar signal.

12. The radar unit of claim 1, wherein the receiver circuit includes a millimeter wave, mmW, unit and a baseband unit, and wherein said radar signal is an echo signal of a radar signal previously transmitted by the radar unit.

13. A vehicle comprising:
a radar unit comprising:
a receiver circuit configured to receive a radar signal; and
a controller configured to control said receiver circuit, wherein said controller is configured to cause said receiver circuit to operate either in a complex receiver mode or in a real receiver mode, wherein said controller is configured to increase a capacitance of a filter and reduce a resistance of the filter.

14. A method of operating a radar unit, comprising:
receiving, by a receiver circuit comprised in the radar unit, a radar signal;
controlling, by a controller comprised in said radar unit, said receiver circuit, wherein said controller causes said receiver circuit to operate either in a complex receiver mode or in a real receiver mode, wherein said controller is configured to increase a capacitance of a filter and reduce a resistance of the filter.

15. The method of claim 14, wherein the complex receiver mode corresponds to a long-range communication mode of the radar unit and wherein the real receiver mode corresponds to a short-range communication mode of the radar unit.

16. The method of claim 14, wherein controlling by the controller further causes the receiver circuit to use, in the complex receiver mode, an I-channel and a Q-channel of the received radar signal.

17. The method of claim 16, wherein controlling by the controller further causes the receiver circuit to use, in the real receiver mode, only said I-channel of the received radar signal.

18. The method of claim 17, wherein controlling by the controller further causes said receiver circuit to use only said I-channel by shorting the Q-channel to ground.

19. The method of claim 17, wherein controlling by the controller further increases a high-pass filter capacitance of the I-channel and decreases a high-pass filter resistance of the I-channel when the receiver circuit operates in the real receiver mode.

20. The method of claim 19, wherein controlling by the controller further doubles the high-pass filter capacitance and divides the high-pass filter resistance by two.

* * * * *